United States Patent
Zock

(10) Patent No.: US 12,103,379 B2
(45) Date of Patent: Oct. 1, 2024

(54) MODIFIED GAS TANK WITH BUILT-IN FUEL PUMP WITH INTERNAL REGULATOR ADAPTED FOR UTILITY, OFF-ROAD, AND ALL-TERRAIN VEHICLES AND A METHOD OF INSTALLING THE SAME

(71) Applicant: Richard Mellick Zock, Lapeer, MI (US)

(72) Inventor: Richard Mellick Zock, Lapeer, MI (US)

(*) Notice: Subject to any disclaimer, the term of this patent is extended or adjusted under 35 U.S.C. 154(b) by 0 days.

(21) Appl. No.: 17/446,756

(22) Filed: Sep. 2, 2021

(65) Prior Publication Data
US 2023/0068333 A1    Mar. 2, 2023

(51) Int. Cl.
B60K 15/03    (2006.01)

(52) U.S. Cl.
CPC .... *B60K 15/03* (2013.01); *B60K 2015/03243* (2013.01)

(58) Field of Classification Search
CPC ...................................................... B60K 15/073
USPC ........................................ 123/495, 497, 509
See application file for complete search history.

(56) References Cited

U.S. PATENT DOCUMENTS

| | | | | |
|---|---|---|---|---|
| 3,343,703 A * | 9/1967 | Snyder | ...................... | B60R 3/00 D9/527 |
| 5,613,476 A * | 3/1997 | Oi | .......................... | F02M 37/10 123/514 |
| 6,014,957 A * | 1/2000 | Robinson | ................ | F02M 37/10 137/590 |
| 6,062,203 A * | 5/2000 | Takahashi | .............. | F02M 37/44 123/509 |
| 6,142,126 A * | 11/2000 | Kanamaru | ......... | B01D 35/0273 123/509 |
| 6,206,035 B1 * | 3/2001 | Wehner | ................... | F02M 37/10 123/497 |
| 6,216,671 B1 * | 4/2001 | Sawert | ................. | F02M 37/106 123/497 |

(Continued)

OTHER PUBLICATIONS

NPL Journal Article "Rick's Tanks Explains Why It's Very Important To Be Baffled"; Author Michael Harding, published to the internet Jan. 5, 2015; URL: https://www.streetmusclemag.com/news/ricks-hot-rod-shop-explains-important-baffled/ (Year: 2015).*

(Continued)

*Primary Examiner* — Jacob M Amick
*Assistant Examiner* — Omar Morales
(74) *Attorney, Agent, or Firm* — Dunlap Bennett & Ludwig, PLLC

(57) ABSTRACT

A modified fuel tank for utility, off-road and all-terrain vehicles. The modified fuel tank has a built-up first side and a thinner second side, wherein a modified opening is formed through a portion of both. A modified insert is dimensioned and adapted to engage the periphery of the modified opening through a sidewall including a curved portion and a tapered portion to accommodate the transition between the first side and the second side. A pump assembly with a built-in regulator is supported by the modified insert, by way of a retaining lip and a seal and retaining ring, so that the pump assembly is fluidly coupled to the fuel compartment of the modified fuel tank, and an outlet protrudes just above the modified insert.

8 Claims, 4 Drawing Sheets

(56) References Cited

U.S. PATENT DOCUMENTS

| | | | | |
|---|---|---|---|---|
| 6,230,690 | B1* | 5/2001 | Umetsu | B60K 15/077 |
| | | | | 123/509 |
| 6,253,790 | B1* | 7/2001 | Hara | B62J 35/00 |
| | | | | 137/565.17 |
| 6,609,503 | B1* | 8/2003 | Nakagawa | B62J 35/00 |
| | | | | 137/565.34 |
| 6,679,292 | B2* | 1/2004 | Ootaka | F02M 37/103 |
| | | | | 137/565.17 |
| 7,451,745 | B2* | 11/2008 | Okazaki | B62J 35/00 |
| | | | | 123/509 |
| 7,997,622 | B2* | 8/2011 | Yamada | B62J 35/00 |
| | | | | 280/833 |
| 8,286,744 | B2* | 10/2012 | Mizukura | B62J 35/00 |
| | | | | 180/69.4 |
| 9,126,648 | B2* | 9/2015 | Nishimura | B62J 35/00 |
| 9,150,268 | B2* | 10/2015 | Inoue | F02M 37/103 |
| 2002/0113694 | A1* | 8/2002 | Muirhead | G08B 13/2434 |
| | | | | 340/603 |
| 2002/0124833 | A1* | 9/2002 | Fauser | F02M 69/54 |
| | | | | 123/509 |
| 2006/0260696 | A1* | 11/2006 | Leymarie | F02M 37/106 |
| | | | | 123/576 |
| 2007/0169975 | A1* | 7/2007 | Kubota | F02M 37/103 |
| | | | | 180/69.4 |
| 2007/0235089 | A1* | 10/2007 | Koike | F02M 37/103 |
| | | | | 137/565.17 |

OTHER PUBLICATIONS

"5.17 Prepping Fuel Tank for EFI and Project Update" (Digital Video posted by "Matt's Garage" to YouTube Jun. 25, 2019; URL: https://www.youtube.com/watch?v=5SpigcU66ew (Year: 2019).*

"5.18 EFI Fuel Tank Conversion—Part Deux" (Digital Video posted by "Matt's Garage" to YouTube Jun. 27, 2019; URL: https://www.youtube.com/watch?v=DoWigXHT714&t=617s (Year: 2019).*

"In-Tank Fuel Pump Module—PA-Series" (Archived Website of the fuel pump module cited/used in "Matt's Garage" video's Archive URL: https://archive.org/web/; archived website URL: https://www.tanksinc.com/index.cfm/page/ptype%3Dproduct/product_id%3D84/category_id%3D61/mode%3Dprod/prd84.htm (Year: 2019).*

* cited by examiner

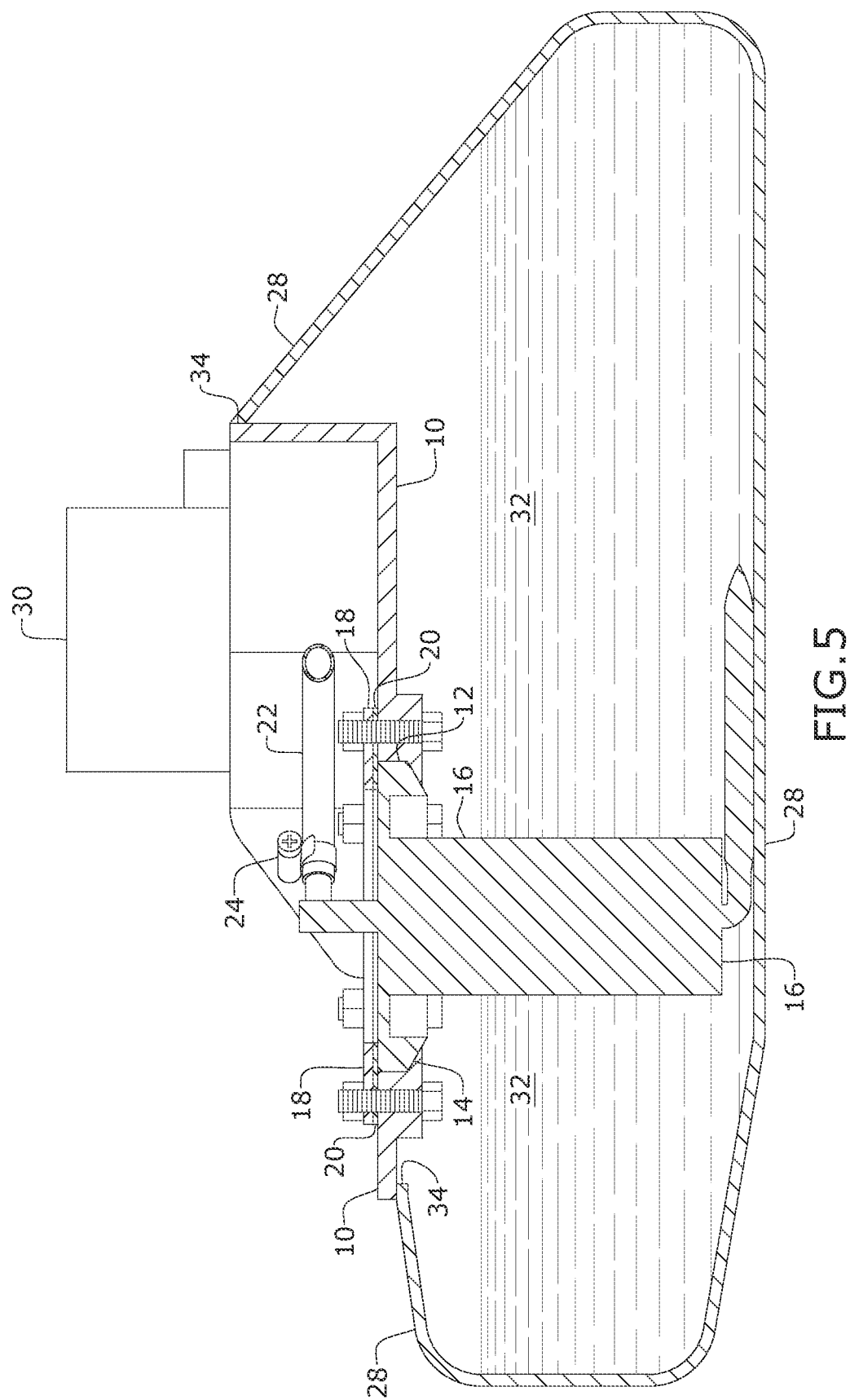

MODIFIED GAS TANK WITH BUILT-IN FUEL PUMP WITH INTERNAL REGULATOR ADAPTED FOR UTILITY, OFF-ROAD, AND ALL-TERRAIN VEHICLES AND A METHOD OF INSTALLING THE SAME

BACKGROUND OF THE INVENTION

The present invention relates to accessories for utility, off-road, and all-terrain vehicles and more particularly, to a modified gas tank with a built-in fuel pump with an internal regulator, and a method of installing the same. The modified gas tank is adapted for utility, off-road and all-terrain vehicles, including but not limited to dirt bikes like, as an example, a 2006-2009 Suzuki LT-R450 Quadracer™.

The existing original equipment manufacturer (OEM) fuel systems for utility, off-road and all-terrain vehicles typically consist of an external fuel pump, regulator and petcock assembly that tends to malfunction and is also an ineffective way of supplying fuel to the motor. In other words, current fuel systems for utility, off-road and all-terrain vehicles are too complicated (i.e., too many parts) for the average rider to understand, maintain, and make repairs to, and thus the user needs to pay professional fees to have a professional make the repairs.

Accordingly, there is a need for a modified gas tank with a built-in fuel pump with internal regulator, and a method of installing the same. The modified gas tank is adapted for utility, off-road and all-terrain vehicles in such a way as to be simpler, less expensive, and a more efficient way of delivering fuel to the motor. The replacement fuel tank embodied in the present invention may be modified to include a fuel pump with a built-in pressure regulator that replaces the existing fuel system.

SUMMARY OF THE INVENTION

In one aspect of the present invention, a modified fuel tank includes the following: a built-up first side and a narrower second side wherein an opening is formed through a portion of both sides; an insert engaging an entire periphery of the opening, wherein the insert has a planar base and a sidewall having a tapered portion to accommodate a transition from the built-up first side to the narrow second side; and a pump opening in the planar base.

In another aspect of the present invention, the above-mentioned modified fuel tank further includes a retaining lip downward of the pump opening, wherein the retaining lip provides a shelf; and further including a pump assembly with a built-in regulator, wherein a pump of the pump assembly is fluidly connected to a fuel compartment of defined by the built-up first side and the narrow second side; and further including a flange head attached to the pump assembly, wherein the flange head is dimensioned to sit on the shelf of the retaining lip; and further including a fuel outlet protruding just above the opening, wherein the fuel outlet is directed in a first direction; and a wire harness operatively associated with the pump assembly, wherein the wire harness is directed in a second direction from the flange head, and wherein the first direction is directed away from the second direction.

In yet one aspect of the present invention, a method of modifying a fuel tank includes the following: cutting an opening into an upper portion of the fuel tank; connecting an insert along a periphery of the opening, wherein the insert has a pump opening communicating with a fuel compartment of the fuel tank; and retaining a pump assembly with a built-in regulator in the pump opening so that a pump of the pump assembly is fluidly coupled to the fuel compartment.

In still another aspect of the present invention the above-mentioned method further includes adding a retaining lip just downward of the pump opening; and seating a flange head of the pump assembly on the retaining lip; securing the pump assembly to the insert by way of a seal and a retaining ring sandwiching the seal against an upper portion of the flange head; directing a fuel outlet of the pump assembly in a first direction; and directing a wire harness of the pump assembly in a second direction, wherein the first direction and the second direction facing away from each other.

These and other features, aspects and advantages of the present invention will become better understood with reference to the following drawings, description and claims.

BRIEF DESCRIPTION OF THE DRAWINGS

FIG. 5 is a section view of an exemplary embodiment of the present invention, taken along line 5-5 in FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a modified fuel tank for utility, off-road and all-terrain vehicles. The modified fuel tank has a built-up first side and a thinner second side, wherein a modified opening is formed through a portion of both. A modified insert is dimensioned and adapted to engage the periphery of the modified opening through a sidewall including a curved portion and a tapered portion to accommodate the transition between the first side and the second side. A pump assembly with a built-in regulator is supported by the modified insert, by way of a retaining lip and a seal and retaining ring, so that the pump assembly is fluidly coupled to the fuel compartment of the modified fuel tank, and an outlet protrudes just above the modified insert.

Figure 1:
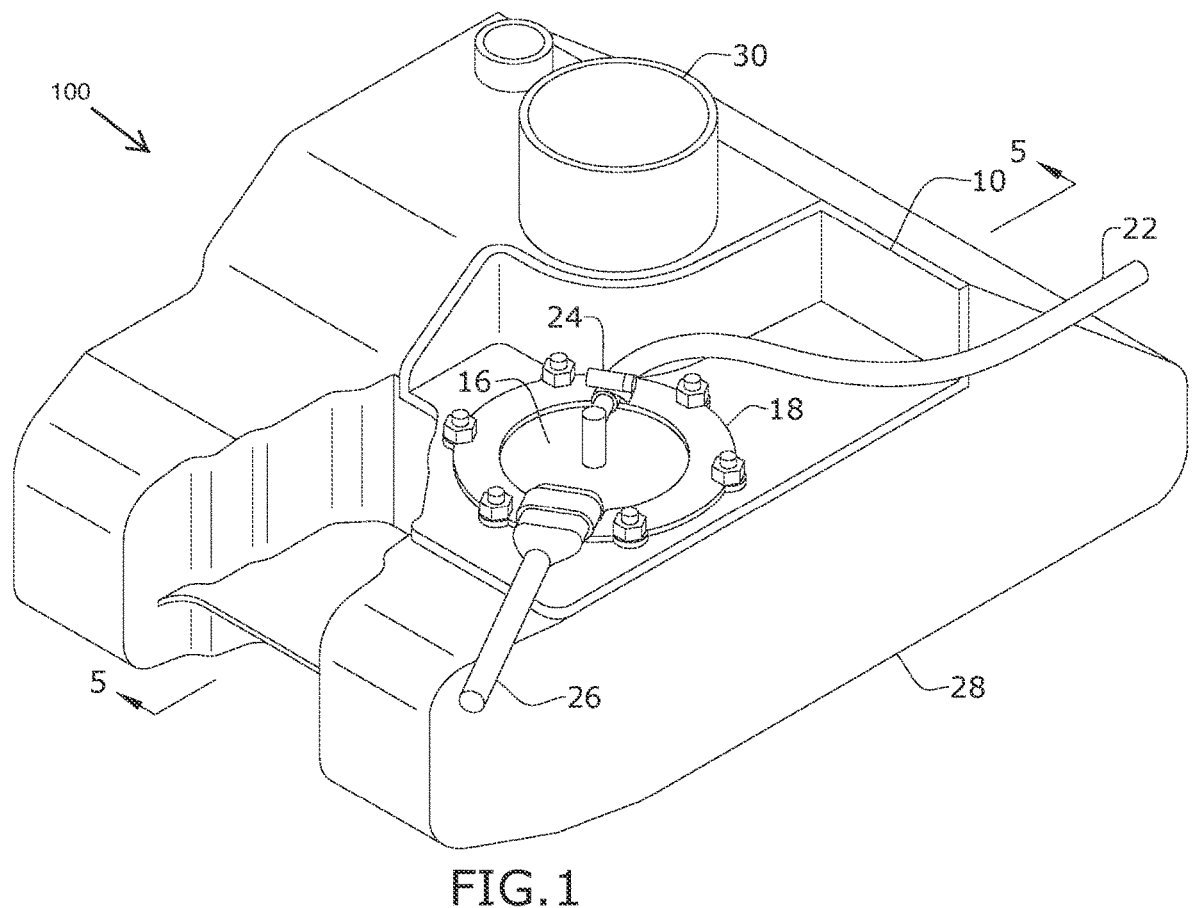
FIG. 1 is a perspective view of an exemplary embodiment of the present invention, shown in use.
Figure 2:
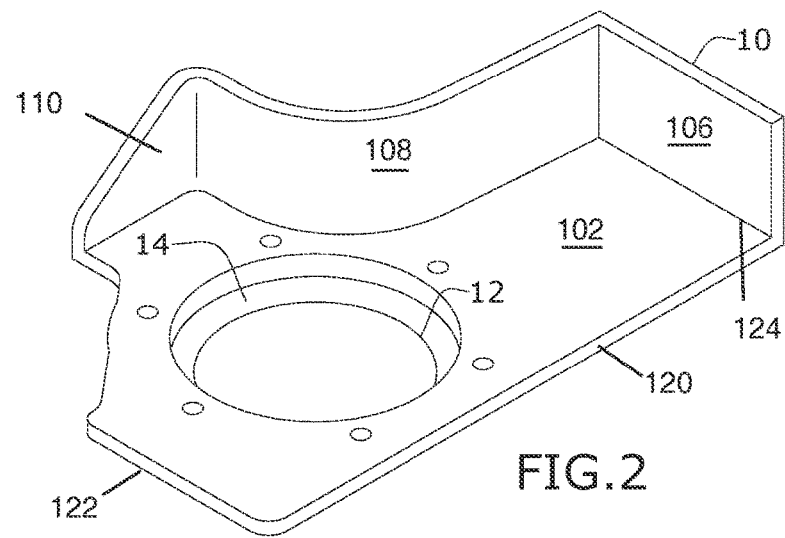
FIG. 2 is a perspective view of an exemplary embodiment of the present invention.
Figure 3:
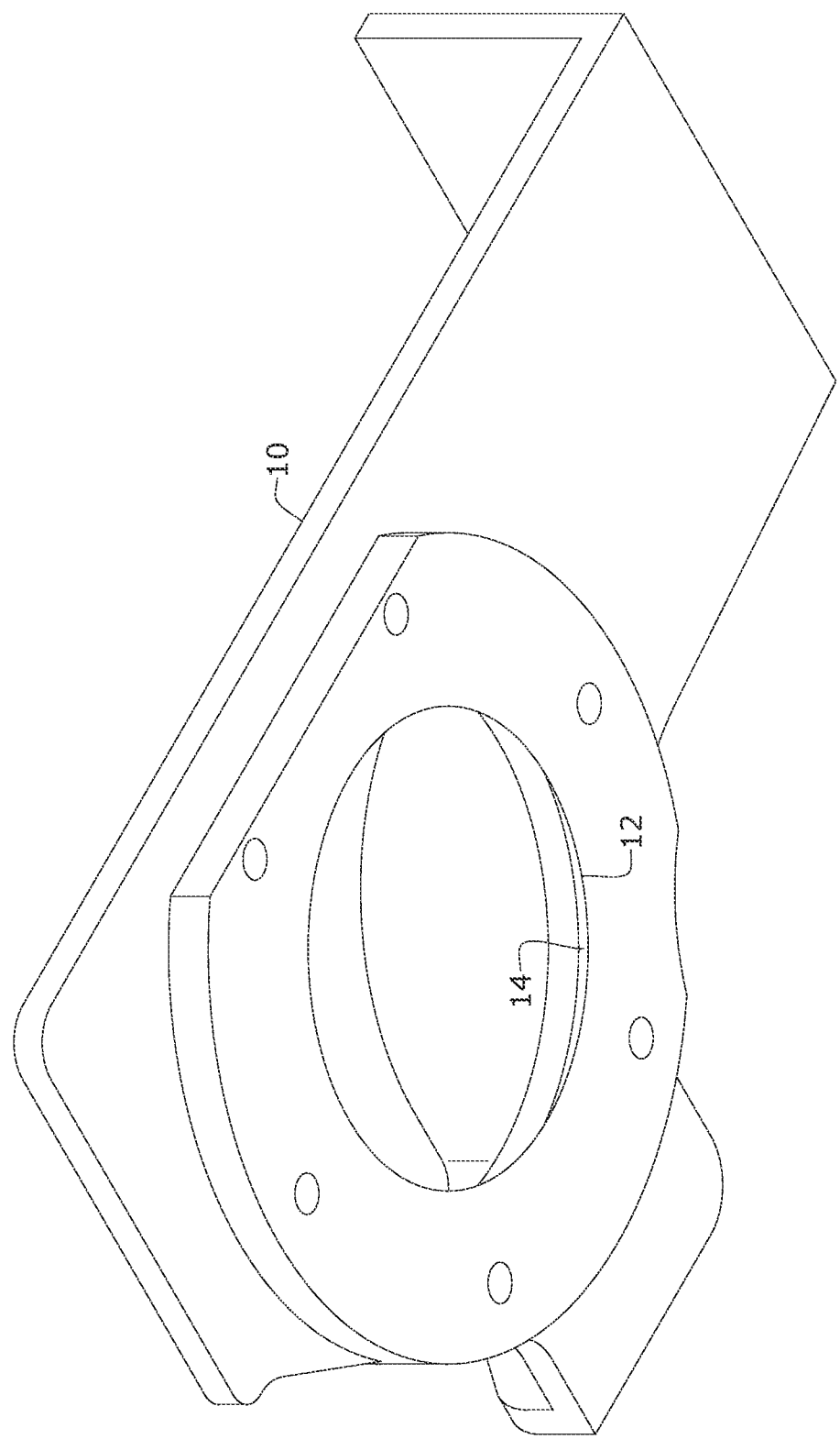
FIG. 3 is a bottom perspective view of an exemplary embodiment of the present invention.
Figure 4:
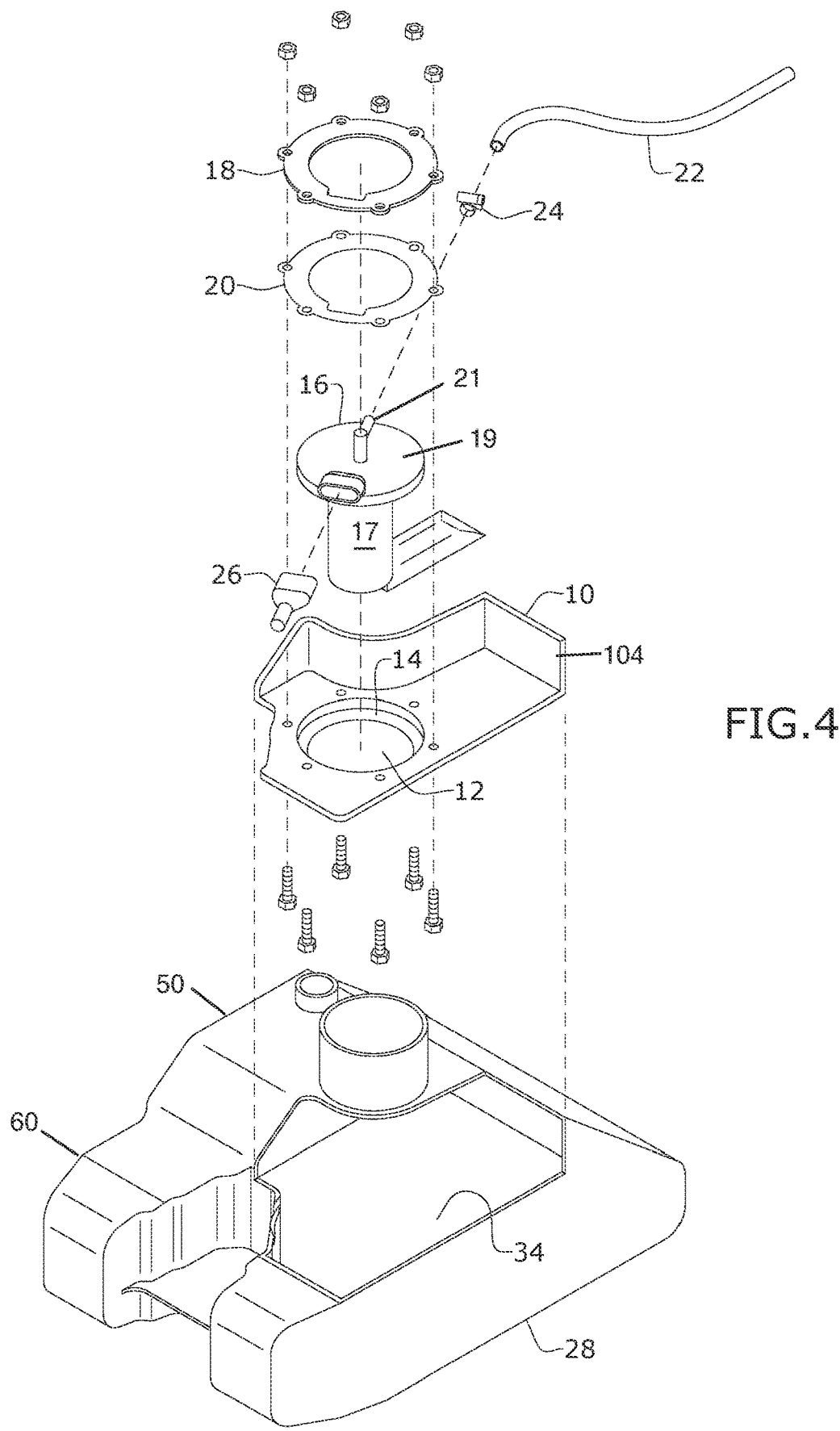
FIG. 4 is an exploded perspective view of an exemplary embodiment of the present invention.

Referring to FIGS. 1 through 5, the present invention may include a modified gas tank 100 with a built-in fuel pump assembly with internal regulator, and a method of installing the same. The modified gas tank 100 may include a fuel tank 28 having a filling opening 30, wherein the fuel tank 28 defines a compartment for storing fuel 32. A cutout 34 of the fuel tank 28 is dimensions and adapted to provide an opening whose periphery engages a periphery of a modified insert 10. The modified insert 10 may have a planar base 102, wherein the base 102 has a length and a width substantially greater than a depth. Along one or more peripheries of the base 102 an upward extending sidewall 104 may be perpendicularly joined. The sidewall 104 may include a rectangular portion 106 that transitions to a curved portion 108 that in turn sequentially transitions to a tapered portion 110. The base 102 may have no sidewalls along two orthogonal edges, one a longitudinal edge 120 and the other a first latitudinal edge 122. The rectangular portion 106 may extend along a second latitudinal edge 124, opposite the first latitudinal edge 122. The tapered portion 110 may taper downward from a shared elevation of the rectangular portion 106 and the curved portion 108 to the base 102.

The base 102 has an opening 12 with a circumferential retaining lip 14 downward (opposite the direction of the sidewall 104) of the opening 12. A pump assembly 16 with built-in regulator may have a cylindrical body 17 and a flanged head 19, wherein the cylindrical body 17 is dimensioned and adapted to slidably be received in the opening 12 so that the flanged head 19 is supported on the retaining lip 14 and the pump assembly 16 is fluidly coupled to the compartment fuel 32. A retaining ring 18 may be dimensioned and adapted to sandwich a seal 20 against a portion of the base 102 surrounding the opening 12 so that an outlet 21 fluidly coupled to the pump assembly 16 protrudes above the opening 12 in use.

A fuel hose 22 may fluidly connect to the outlet 21 from a first direction by way of a clamp 24. A wire harness 26 may operatively associate with the flange head 19, wherein the wire harness 26 is directed in a second direction opposition a first direction.

The fuel tank 28 provides storage of the fuel 32 that will then be supplied to the motor via the pump assembly 16. The fuel pump assembly 16 provides the correct amount of fuel to the motor by means of a built-in fuel pressure regulator that is already preset to specifications. The seal 20 provides a tight seal between the fuel pump assembly 16 and the fuel tank 28. The retaining ring 18 has precut openings that fit onto the fuel pump assembly 16 only one way, whereby fasteners hold the entire pump assembly 16 together ensuring the seal is tight and the retaining ring 18 is in place. The premade made wire harness 26 provides an electrical current to the pump assembly 16 and electrically plugs into the pump assembly 16. The fuel hose 22 allows fuel to be supplied from the pump assembly 16 to the injector, and the fuel hose 22 is held in place by the fuel clamps 24.

The modified insert 10 is dimensioned and adapted to fit the curve of the fuel tank 28 that the fuel pump assembly 16 would fit into, as a fuel tank 28 for utility, off-road and all-terrain vehicles typically have a built-up first side 50 associated with the filling opening which must be by an exterior surface of the machine. A second side 60 tapers downward, providing a lower profile, for mounting to the frame of the machine. The modified insert 10 and thus the modified opening 34 contemplates include portions of both the first side 50 and the second side 60.

A method of installing the present invention may include the following. First, a user may provide the modified gas tank 100 disclosed above. The user would simply remove their old existing fuel tank and fuel system and follow the instructions of the plug and play unit enabled by the modified insert 10 of the present invention, after the modified opening 34 is formed into the fuel tank 28.

Additionally, the present invention could be used in other fields like automotive machines, agriculture equipment, and the like, as long as the motor would need the same fuel requirements as the assembly.

It should be understood, of course, that the foregoing relates to exemplary embodiments of the invention and that modifications may be made without departing from the spirit and scope of the invention as set forth in the following claims.

What is claimed is:

1. A modified fuel tank for a utility vehicle, an off-road vehicle, or an all-terrain vehicle, the modified fuel tank comprising:
  a built-up first side and a tapering second side, wherein the first side has a first length at least a quarter of a longitudinal length of the modified fuel tank so as to be adjacent an exterior of said vehicle, and the second side has a second length at least a quarter of the longitudinal length of the modified fuel tank so as to mount to a frame of said vehicle, and wherein an opening is formed through a portion of both the first and second sides;
  an insert engaging an entire periphery of the opening, wherein the insert has a planar base and a sidewall having a tapered portion to accommodate a transition from the built-up first side to the tapering second side;
  a pump opening in the planar base;
  a retaining lip extending from an underside of the insert to define a shelf downward and just inward of the pump opening, wherein the shelf tapers downward as the shelf extends toward a center of the pump opening; and
  a plurality of fastener holes provided along the retaining lip so that the plurality of fastener holes is underneath the planar base so that a fastener through a said hole passes through the planar base and the retaining lip for tightly sealing purposes.

2. The modified fuel tank of claim 1, further comprising a pump assembly with a built-in regulator, wherein a pump of the pump assembly is fluidly connected to a fuel compartment defined by the built-up first side and the tapering second side.

3. The modified fuel tank of claim 2, further comprising a flange head attached to the pump assembly, wherein the flange head is dimensioned to sit on the shelf of the retaining lip.

4. The modified fuel tank of claim 3, further comprising a fuel outlet protruding just above the opening, wherein the fuel outlet is directed in a first direction; and a wire harness operatively associated with the pump assembly, wherein the wire harness is directed in a second direction from the flange head, and wherein the first direction is directed away from the second direction.

5. A method of modifying a fuel tank for a utility vehicle, an off-road vehicle, or an all-terrain vehicle, the method comprising:
  cutting an opening into an upper portion of the fuel tank, wherein the fuel tank comprises a built-up first side and a tapering second side, wherein the first side has a first length at least a quarter of a longitudinal length of the modified fuel tank so as to be adjacent an exterior of said vehicle, and the second side has a second length at least a quarter of the longitudinal length of the modified fuel tank so as to mount to a frame of said vehicle, and wherein an opening is formed through a portion of both the first and second sides;
  connecting an insert along a periphery of the opening, wherein the insert has a pump opening communicating with a fuel compartment of the fuel tank;
  extending a separate retaining lip to an underside of the insert so as to define a shelf downward and just inward of the pump opening, wherein the shelf tapers downward as the shelf extends toward a center of the pump opening;

providing a plurality of fastener holes along and through the retaining lip so that the plurality of fastener holes is underneath a planar base of the insert; and retaining a pump assembly with a built-in regulator in the pump opening so that a pump of the pump assembly is fluidly coupled to the fuel compartment.

6. The method of claim 5, further including seating a flange head of the pump assembly on the retaining lip.

7. The method of claim 6, further including securing the pump assembly to the insert by way of a seal and a retaining ring sandwiching the seal against an upper portion of the flange head.

8. The method of claim 6, further including directing a fuel outlet of the pump assembly in a first direction; and directing a wire harness of the pump assembly in a second direction, wherein the first direction and the second direction facing away from each other.

\* \* \* \* \*